UNITED STATES PATENT OFFICE.

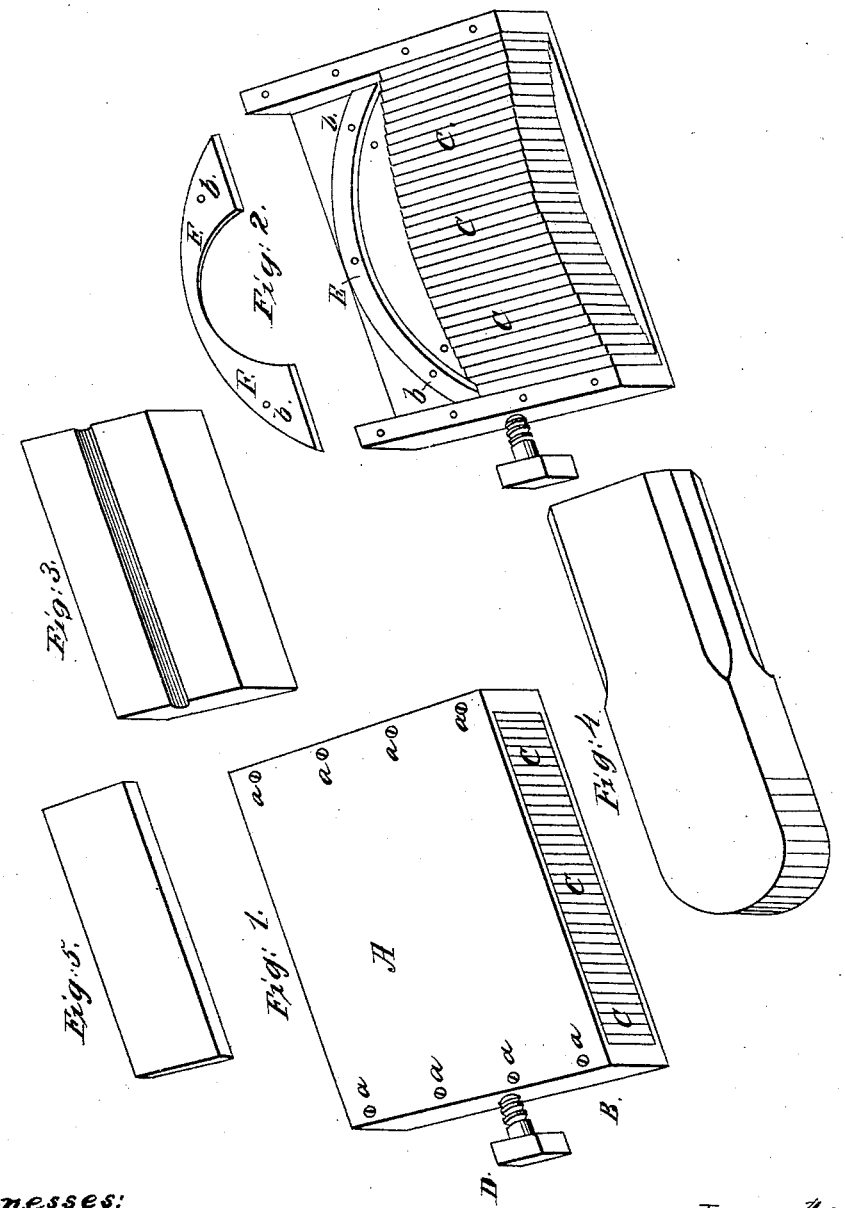

ELIJAH H. DANFORTH, OF JAMESTOWN, NEW YORK.

ADJUSTABLE DENTAL SWAGE.

Specification of Letters Patent No. 23,293, dated March 22, 1859.

*To all whom it may concern:*

Be it known that I, ELIJAH H. DANFORTH, of Jamestown, in the county of Chautauqua and State of New York, have invented a new and useful Machine for Swaging Inferior Dental Plates; and I do hereby declare that the following is a full, clear, and exact description of the construction and operation of the same, reference being had to the annexed drawings, making a part of this specification, in which—

Figure 1 is a perspective view of the adjusting swage, Fig. 2 a descriptive view, Fig. 3 a perspective view of a grooved cubic block, Fig. 4 a follower, and Fig. 5 a bar of steel to accompany Fig. 4.

A, Fig. 1, side plate; B, B end bars; a, a, a, screws or rivets; C, C, C upper ends of a series of movable pieces of metal or hard wood; D a set screw; Fig. 2 side plate A removed; C, C, C, the movable pieces of metal or hard wood; E semicircular stop; F, F, stop describing the segment of a smaller circle; b, b, screws or rivets.

The adjusting swage is constructed of two outer side plates "A," of wrought iron, steel or other metal supported apart by and fastened to two end bars "B," of wrought iron, steel or other metal, by means of screws or rivets a, a, a, a. The space between them is filled with a number of movable pieces of metal or hard wood "C, C, C." There is also inclosed between the plates and fastened to one of them by screws or rivets b, b, b, a stop describing the segment of a greater or lesser circle E and F, F. These several parts may be of the following dimensions, namely: the side plates "A" six inches long, four inches wide and one eighth of an inch in thickness; the end bars B, B, four inches long, one inch wide and five eighths of an inch in thickness; the movable pieces of metal C, C, C, two inches in length on one edge and one and three fourths inches on the other, forming a bevel on the upper end, one inch in width and one eighth of an inch in thickness, and in numbers sufficient to fill the space. The stop may be one eighth of an inch in thickness. The cubic block Fig. 3 may be a four inch cube with a groove on one or more of its superficies one half inch deep and one fourth of an inch wide, and oval at the bottom. The follower Fig. 4 may be of metal or wood six inches long, seven eighths of an inch in thickness and one and one half inch in width, chamfered at one end for convenience in holding, at the other end oval widthwise describing the segment of a circle equal to the lingual curve of the inferior maxillary. The bar Fig. 5 may be of metal four inches long one inch wide and three sixteenths of an inch thick.

The operation of the machine is as follows: A strip of gold, silver or other metal, of the dimensions required for use, being placed lengthwise over the groove in the block, Fig. 3, the bar, Fig. 5, is laid upon it and the metal swaged into the groove; it is then removed and the groove formed in the metal, so swaged, is filled with a sufficient number of thin plates of malleable metal of sufficient width to hold the gold, silver, or other metallic plate firmly against the side plate A, of the adjusting swage, antagonizing with the longest edge of the movable pieces of metal, taking care to lay a thin plate of malleable metal between the gold or silver plate and the movable pieces to prevent marring the gold or silver. The oval end of the follower, Fig. 4, is then set upon the center of the plate and driven until the required curve is obtained, the curve being formed by the moving of the metallic pieces C, C, C, as seen in Fig. 2, until they rest upon the stop at the bottom, the form of this stop thus determining the labial curve and the follower the lingual curve of the plate. The set screw D regulates the resistance.

I am aware that compound dies or dies composed of several pieces of metal clamped together have been used for swaging sheet metal into form, and I therefore, do not claim the compound swaging die; but I am not aware that in swaging sheet metal for any purposes the grooves of sheet metal have been filled with malleable metal and then the sheet subjected to complete or final swaging and What I, therefore, claim is—

Forming the labial and the lingual curve of dental plates for the inferior maxillary alveolar ridge by swaging it into form with the compound die and malleable plates in the curve of the plate as herein set forth.

E. H. DANFORTH.

Witnesses:
C. R. LOCKWOOD,
JAMES M. BROWN.